United States Patent
Luker

(10) Patent No.: US 11,294,668 B1
(45) Date of Patent: Apr. 5, 2022

(54) DYNAMIC IDENTIFICATION AND SELECTION OF APPLICATION PROGRAMMING INTERFACE

(71) Applicant: Amazon Technologies, Inc., Seattle, WA (US)

(72) Inventor: Matthew Luker, Port Angeles, WA (US)

(73) Assignee: Amazon Technologies, Inc., Seattle, WA (US)

( * ) Notice: Subject to any disclaimer, the term of this patent is extended or adjusted under 35 U.S.C. 154(b) by 122 days.

(21) Appl. No.: 15/658,231

(22) Filed: Jul. 24, 2017

(51) Int. Cl.
　　G06F 9/44　　(2018.01)
　　G06F 8/76　　(2018.01)
(52) U.S. Cl.
　　CPC ..................... G06F 8/76 (2013.01)
(58) Field of Classification Search
　　CPC .......................................................... G06F 8/76
　　USPC ......................................................... 717/101
　　See application file for complete search history.

(56) References Cited

U.S. PATENT DOCUMENTS

| | | | | |
|---|---|---|---|---|
| 6,389,403 B1* | 5/2002 | Dorak, Jr. | ............... | G06F 21/10 705/51 |
| 7,249,065 B2* | 7/2007 | Bliakhman | ............ | G06Q 30/06 705/26.4 |
| 7,263,506 B2* | 8/2007 | Lee | ........................ | G06Q 20/04 705/318 |
| 7,729,940 B2* | 6/2010 | Harvey | ............... | G06Q 10/0639 705/7.31 |
| 9,104,519 B1* | 8/2015 | Newstadt | ................... | G06F 8/65 |
| 9,839,267 B1* | 12/2017 | Gharabegian | ........... | G06F 3/167 |
| 9,953,314 B2* | 4/2018 | Jaquez | .................... | G06Q 20/36 |
| 2003/0187971 A1* | 10/2003 | Uliano | .................... | G06Q 30/06 709/223 |
| 2004/0019528 A1* | 1/2004 | Broussard | .......... | G06Q 30/0601 705/26.1 |
| 2004/0148229 A1* | 7/2004 | Maxwell | ................ | G06Q 30/06 705/14.73 |
| 2007/0192206 A1* | 8/2007 | Manesh | .................. | G06Q 30/06 705/26.35 |
| 2011/0119155 A1* | 5/2011 | Hammad | ................ | G06F 21/34 705/26.41 |
| 2011/0288907 A1* | 11/2011 | Harvey | ............... | G06Q 10/0639 705/7.29 |
| 2013/0167105 A1* | 6/2013 | Goldman | ................ | G06F 21/10 717/101 |

(Continued)

*Primary Examiner* — Evral E Bodden
(74) *Attorney, Agent, or Firm* — Lee & Hayes, P.C.

(57) ABSTRACT

Techniques are disclosed herein for selection of an electronic system to perform a transaction requested from within software. Using technologies described herein, software can utilize different electronic systems to perform a transaction. For example, software may allow a user to acquire processing by a remote system, such as obtaining additional content or services from more than one electronic system. Instead of software being tied to a particular electronic system (e.g., the electronic system from which the software was acquired), the software can identify and provide options of different electronic systems for performing a transaction. A software provider can use a software developer kit and/or application programming interfaces provided by a service provider to incorporate functionality to identify and access the different electronic systems that are available for selection.

20 Claims, 8 Drawing Sheets

(56) References Cited

U.S. PATENT DOCUMENTS

| | | | |
|---|---|---|---|
| 2013/0238455 A1* | 9/2013 | Laracey | G06Q 20/108 |
| | | | 705/21 |
| 2014/0025521 A1* | 1/2014 | Alsina | G06Q 30/0601 |
| | | | 705/26.1 |
| 2014/0086177 A1* | 3/2014 | Adjakple | H04W 12/08 |
| | | | 370/329 |
| 2014/0089120 A1* | 3/2014 | Desai | G06Q 20/322 |
| | | | 705/21 |
| 2014/0129437 A1* | 5/2014 | Desai | G06Q 20/08 |
| | | | 705/41 |
| 2014/0129438 A1* | 5/2014 | Desai | G06Q 20/08 |
| | | | 705/41 |
| 2014/0214686 A1* | 7/2014 | Wu | G06Q 30/06 |
| | | | 705/64 |

\* cited by examiner

DYNAMIC IDENTIFICATION AND SELECTION OF APPLICATION PROGRAMMING INTERFACE

BACKGROUND

Today, many users acquire software products from electronic marketplaces. The catalog for an electronic marketplace from which customers may choose software products may include a large number of software products that typically increase and change on a daily basis. Modifying a software product to work on different electronic systems, however, can require the software provider to invest substantial time and resources.

DETAILED DESCRIPTION

Figure 1:
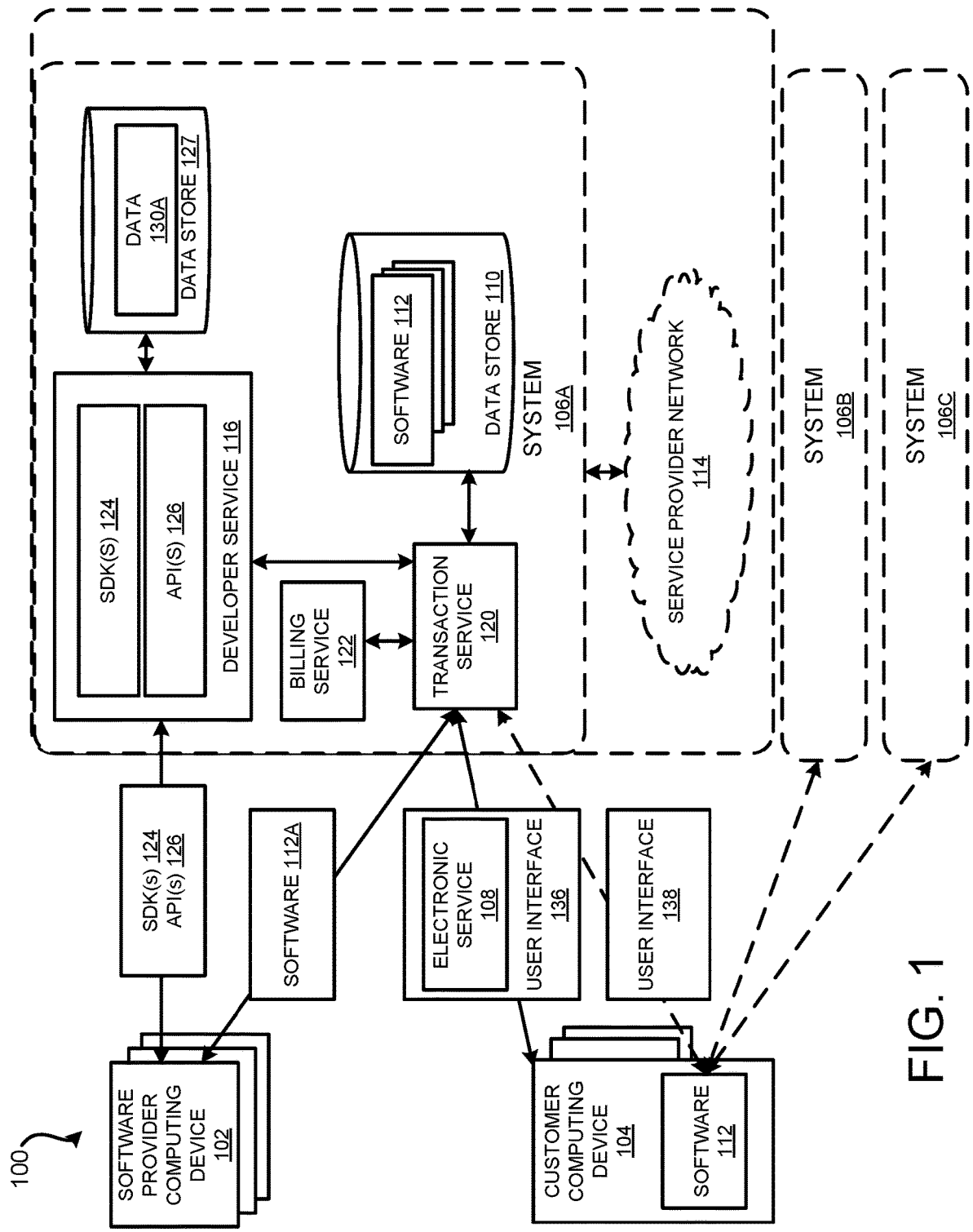
FIG. 1 is a block diagram depicting electronic systems that can be selected to perform a transaction requested by software.

The following detailed description is directed to technologies for dynamic identification and selection of different Application Programming Interfaces (APIs) from within software. Using technologies described herein, software can dynamically identify and utilize different APIs associated with different electronic systems to perform a transaction. For example, software may allow a user to acquire content, processing (local and/or remote), services, or other benefits through an In-App Purchase (IAP), or some other type of transaction, from more than one electronic system. According to some configurations, a transaction request identifies the processing to be performed by a remote system. For instance, the processing performed by the remote system may include processing an IAP request, processing associated with obtaining content, services, and the like.

Instead of software being configured to work only with a single API that is tied to a single electronic system, the software can dynamically identify different APIs that are associated with different electronic systems for performing a transaction.

Software can include any programs and/or software services, for example, an application (or "app" on a mobile device), a machine image, or programs provided as a service ("SaaS"). In some configurations, the software is available from an electronic system and can be downloaded by a customer and executed on a computing device. The software might also be executed within a service provider network or some other type of distributed computing configuration.

According to some configurations, developers utilize one or more software development toolkits (SDK) and/or application programming interfaces (APIs) to create software that includes functionality to dynamically identify different APIs associated with different electronic systems and allows users to choose what electronic system is used for a transaction. In some examples, a SDK provides support for the development of the application that allows selection of different electronic systems via an associated API from within the software. The SDK can provide tools for the developer to utilize functionality exposed by one or more APIs to connect the software to an available electronic system for performing a transaction. In some configurations, the software utilizes the SDK to dynamically identify the available electronic systems for performing a transaction. According to some techniques, the software identifies software on the computing device that is associated with different electronic systems. For example, the software can identify electronic systems previously utilized by the computing device and/or the electronic systems supported by the electronic device. In some instances, the preferences of the customer and/or some other authorized entity can specify one or more electronic systems to utilize.

Once the developer has modified the software to support the identification and selection of the different electronic systems to perform a transaction, the software can be made available on one or more electronic systems. In some cases, the same software can be available on different electronic systems with little to no modification.

After a user acquires software that includes support for selection of different electronic systems, the user may initiate a transaction from within the software. As an example, when a user initiates a transaction, such as an in-app purchase, the software can generate and display a user interface that shows the different electronic systems that are available for performing the transaction. As discussed briefly above, the software dynamically identifies the electronic systems that are available to complete the transaction. For example, the software can determine the electronic systems previously utilized by the computing device and/or the electronic systems supported by the electronic device. In some examples, the preferences of the customer and/or some other authorized entity can specify one or more electronic systems to utilize.

In some configurations, a default electronic system and other supported electronic systems are shown along with the price of the item at each electronic system. The electronic system may be arranged according to various criteria, including but not limited to customer preference, preference of some other authorized entity/individual, frequency of use, and the like. The purchase price can be different on one or more of the electronic systems. The user selects (e.g., clicking on the desired electronic system) the electronic system to complete the transaction. If the user chooses an electronic system on which the user has an account, the purchase is made from the electronic system. When the user does not have an account on the electronic system, an account can be set up with the selected electronic system. According to some configurations, the software can also utilize the API(s) to query the electronic system to determine what items the user has already acquired.

As briefly described, instead of developers having to invest time and resources into supporting a software for each different service, developers can utilize the SDK to deploy software that include functionality that allows the software to utilize different electronic system for completing a transaction. The SDK allows developers to focus on creating functionality relating to the object of the software rather than having to focus resources on supporting infrastructure of different electronic system. Additionally, users are given a choice of the electronic system to use to process and support transactions. Additional details regarding the various components and processes described above relating to selection of different electronic systems from within software will be presented below with regard to FIGS. 1-8.

It should be appreciated that the subject matter presented herein may be implemented as a computer process, a computer-controlled apparatus, a computing system, or an article of manufacture, such as a computer-readable storage medium. While the subject matter described herein is presented in the general context of software that executes on one or more computing devices, those skilled in the art will recognize that other implementations may be performed in combination with other types of software. Generally, software includes methods, programs, components, data structures and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances and the like. As mentioned briefly above, the examples described herein may be practiced in distributed computing configurations, where tasks may be performed by remote computing devices that are linked through a communications network. In a distributed computing configuration, software may be located in both local and remote memory storage devices.

In the following detailed description, references are made to the accompanying drawings that form a part hereof, and that show, by way of illustration, specific examples or examples. The drawings herein are not drawn to scale. Like numerals represent like elements throughout the several figures (which may be referred to herein as a "FIG." or "FIGS.").

FIG. 1 is a block diagram 100 depicting electronic system that can be selected to perform a transaction requested within software. As illustrated in FIG. 1, the block diagram 100 includes one or more software provider computing devices 102 and one or more customer computing devices 104 in communication with one or more electronic systems 106. The electronic systems 106 may provide electronic services 108. In some examples, an electronic system 106 may be associated with and/or implemented by resources provided by a service provider network 114.

A software provider, using a software provider-computing device 102, may provide software 112 to the electronic service 108 for inclusion in an online software product catalog that is stored within a data store 110. For example, the software 112 might be applications that are available for download and use on a customer computing device 104, such as applications for use on a tablet or smartphone computing device. Alternately, the software 112 may be virtual machine images or other types of software components that may be executed on computing resources provided by the service provider network 114. As discussed briefly above, the software may include functionality to utilize different electronic systems 106.

At some point after the software 112 is made available for use, the electronic system 106 may make the software 112, as well as other software 112 available to customers. As used herein, the terms "customer" and "customers" refer to existing customers of the electronic service 108 provided by the electronic system 106 and/or the service provider network 114 as well as visitors (i.e. potential customers) to the electronic service 108 and/or the service provider network 114. The terms "user" and "users" may be used interchangeably with the terms "customer" and "customers".

A customer, using a customer computing device 104, may access the electronic service 108 to browse and acquire or purchase software 112 made available by the electronic system 106 by the software providers. As used herein, a "purchase" of the software may result in no payment from a customer (e.g., free software), a one-time payment from a customer, or may result in payments from a customer that are made on an ongoing basis depending upon how the software is utilized and executed. In some examples, a purchase of a software establishes a subscription to the software that allows the customer to execute the software at a specified usage fee. The specified usage fee may be based on different factors such as a time the software is executed, a number or type of resources used by the software, a number of operations performed by the software, and the like.

After acquiring the software 112, the customer may configure the software 112 (e.g., via one or more user interfaces) and cause the software 112 to be executed. In some examples, such as in the case of a tablet or smartphone application, the software 112 may be downloaded from the electronic system 106 and executed on the customer computing device 104. In other examples, the software 112 executes in a service provider network 114 that is operated, maintained, provided and/or otherwise associated with an operator of the electronic system. In some examples, the service provider network 114 might be operated by a different entity than the entity that operates the electronic system.

As described in more detail below, the service provider network 114 may include a collection of rapidly provisioned and, potentially, released computing resources hosted in connection with the electronic service or a third party provider. The computing resources may include a number of computing, networking and storage devices in communication with one another. In some examples, the computing resources may correspond to physical computing devices. In other examples, the computing resources may correspond to virtual machine instances implemented by one or more physical computing devices. In still other examples, computing resources may correspond to both virtual machine instances and physical computing devices.

In the illustrated example, the electronic service 108 is implemented by several computer systems that are interconnected using one or more networks. More specifically, the electronic service 108 may be implemented by a transaction service 120, the data store 110 storing the electronic software product catalog including the software 112, and a billing service 122. It should be appreciated that the electronic service 108 may be implemented using fewer or more components than are illustrated in FIG. 1. For example, all or a portion of the components illustrated in the electronic system 106 may be provided by the service provider network 114 as illustrated by a dashed line around the electronic system 106 and the service provider network 114. In addition, the electronic system 106 could include various Web services and/or peer-to-peer network configurations. Thus, the depiction of the electronic system 106 in FIG. 1 should be taken as illustrative and not limiting to the present disclosure.

The service 120 facilitates submission of the software 112 by software providers and browsing and acquisition by customers of software offered through the electronic service 108. Accordingly, a software provider utilizing a software provider computing device 102 may submit software 112 to the electronic service 108 via the service 120. In the current example, the software provider computing device 102 is shown as submitting software 112A. The submitted software 112A may then be included in an electronic software product catalog within data store 110.

The data store 110 can store a software product catalog that includes information on software 112 submitted from different software providers. Accordingly, the service 120 may obtain software from software providers and make the software available to a customer from a single network resource, such as a Web site. In some examples, the data store 110 may include a category designation for the software 112. For example, the software 112 that performs the same or similar functionality may have the same category designation.

Illustratively, the service 120 may generate one or more user interfaces, such as a user interface 136, that can be presented for display on the customer computing device 104, or some other computing device. The user interface 136 can be used to receive input from a customer, utilizing the customer computing device 104, or some other computing device. The input may be related to browsing the available software 112, submitting queries for matching software and viewing information regarding specific software available from the electronic system. A customer may provide an indication via the one or more user interfaces to purchase software 112 from the electronic service 108, configure the software 112 and cause the software 112 to be executed (e.g., on a customer computing device 104 and/or in the service provider network 114). In response to receiving the indication to purchase the software 112 from the electronic service 108 the customer computing device 104 provides data that is received by the transaction service, configure the software 112, and/or cause the software 112 to be executed.

The service 120, or some other computing device, may facilitate the purchase of the software 112. In this regard, the service 120 may receive payment information from the customer computing device 104. The service 120 may also establish an account or update an account for a customer. The account information may include a variety of different information, such as one or more payment methods, billing preferences, address information, communication preferences, privacy preferences, and the like. This information might be obtained by the service 120 and provided to the billing service 122. The billing service 122 may also be configured to process payments from customers and, in some examples, provide payment to the software providers of the software 112. According to some configurations, the billing service 122 can be configured to process payments from customers initiating transactions through a software 112. In some examples, each electronic system 106 is associated with a billing service 122 configured to process payments for transactions utilizing a selected electronic system 106.

As briefly described above, software, such as software 112A, can access different electronic services 108 associated with different electronic systems 106 to perform a transaction. For example, the software 112A may be configured to allow identification of APIs associated with different electronic systems, generation of one or more user interfaces configured to receive a selection of one of the different electronic systems, and cause a transaction to be performed utilizing the selected electronic system.

According to some configurations, a software development toolkit (SDK), such as SDK 124 provides support for the dynamic identification and selection of different electronic systems from within the software 112A. In some examples, the developer service 116 can provide the SDK(s) 124 and the API(s) to the software provider computing device 102, or some other computing device associated with a developer and/or the software provider. The SDK 124 can include software development tools that allow a third-party developer (i.e., a developer that is separate from the service provider of the service provider network 114) to include functionality associated with the dynamic identification and selection of an electronic system to perform a transaction. The electronic systems 106 may also expose one or more application programming interfaces (APIs), such as API 126 that include functionality for utilizing different electronic systems 106 for performing transactions.

The SDK 124 and/or the APIs 126 may include one or more libraries, programming code, executables, other utilities, and documentation that allows the software 112 to directly include functionality for dynamically identifying, selecting and interacting with different electronic systems 106 from within software 112. According to some configurations, the software 112 generates one or more user interfaces that present the available electronic systems and receive a selection from a user of the software that identifies the electronic system they would like to use to process a transaction. The electronic system connection functionality can be accessed by software 112 executing on a computing device external from the service provider and/or on one or more computing devices of the service provider.

Instead of the software 112 having to include an IAP API for each of the different electronic systems, the software 112 can be developed using the SDK to allow the software 112 to access functionality from one or more APIs that are operative to dynamically identify supported electronic systems and to communicate with the different supported electronic systems. Once the software 112 is modified using the SDK to support the identification and selection of the different electronic systems to perform a transaction, the software can be made available from one or more electronic systems 106.

According to some configurations, a user initiates a transaction from within the software 112. As an example, when a user initiates an IAP, the software 112 can display a user interface 138 (See FIG. 3) that shows the different electronic systems that are available for performing the transaction.

In some configurations, the software 112 dynamically identifies the electronic systems that are available to complete the transaction. For example, the software 112 using functionality exposed via one or more of the API(s) 126 can determine the electronic systems previously utilized by the computing device and/or the electronic systems supported by the electronic device. For instance, the preferences of the customer and/or some other authorized entity can specify one or more electronic systems to utilize. According to some techniques, the software 112 that has been modified using the SDK(s) 124 and/or the API(s) 126 performs a scan of the computing device executing the software 112 to identify software that is installed on the computing device 104 that is associated with an electronic system. For example, different IAP software may be installed on the customer computing device 104 to support the different electronic systems. In other examples, the software 112 may locate accounts that are associated with different application stores (e.g., AMAZON APPSTORE, GOOGLE PLAY, or some other application store) to identify supported electronic systems. The software 112 can also access other data to identify supported electronic systems. For example, the software 112 may query some other service to identify supported electronic systems.

As such, instead of developers having to invest time and resources into supporting software for each different electronic system, developers can utilize the SDK 124 to deploy software that include functionality that allows the software to identify and to utilize different electronic systems for completing a transaction. The SDK 124 allows developers to focus on creating functionality relating to the object of the software rather than having to focus resources on supporting infrastructure of different electronic systems. Additionally, users are given a choice of the electronic system to use to process and support transactions.

In addition to the above, software that is obtained through an unsupported channel (e.g., through an unsupported electronic system or from another user) may be identified when the software is executed and/or when the software attempts to initiate a transaction. For instance, a first user may acquire software 112 through an approved electronic system (e.g., GOOGLE PLAY) and then provide the software to a second user. When the second user installs and executes the software, the software can be configured to not work until the second user is associated with a supported electronic system (e.g., makes a purchase from a supported electronic system from within the software). As an example, the software 112 can determine that the electronic device does not include support for an approved electronic system (e.g., GOOGLE PLAY), or some other supported electronic system, and in response cause the software 112 to prevent the software 112 from executing at least a portion of functionality until the second user is associated with a supported electronic system. In some configurations, the software 112 causes a user interface to be generated that guides the user in setting up an account with an approved electronic system. In other examples, the software 112 can be acquired from a transaction service 120 associated with a first electronic system 106A and then subsequent transactions can be processed by one or more other electronic systems (e.g., electronic systems 106B-106C).

Figure 2:
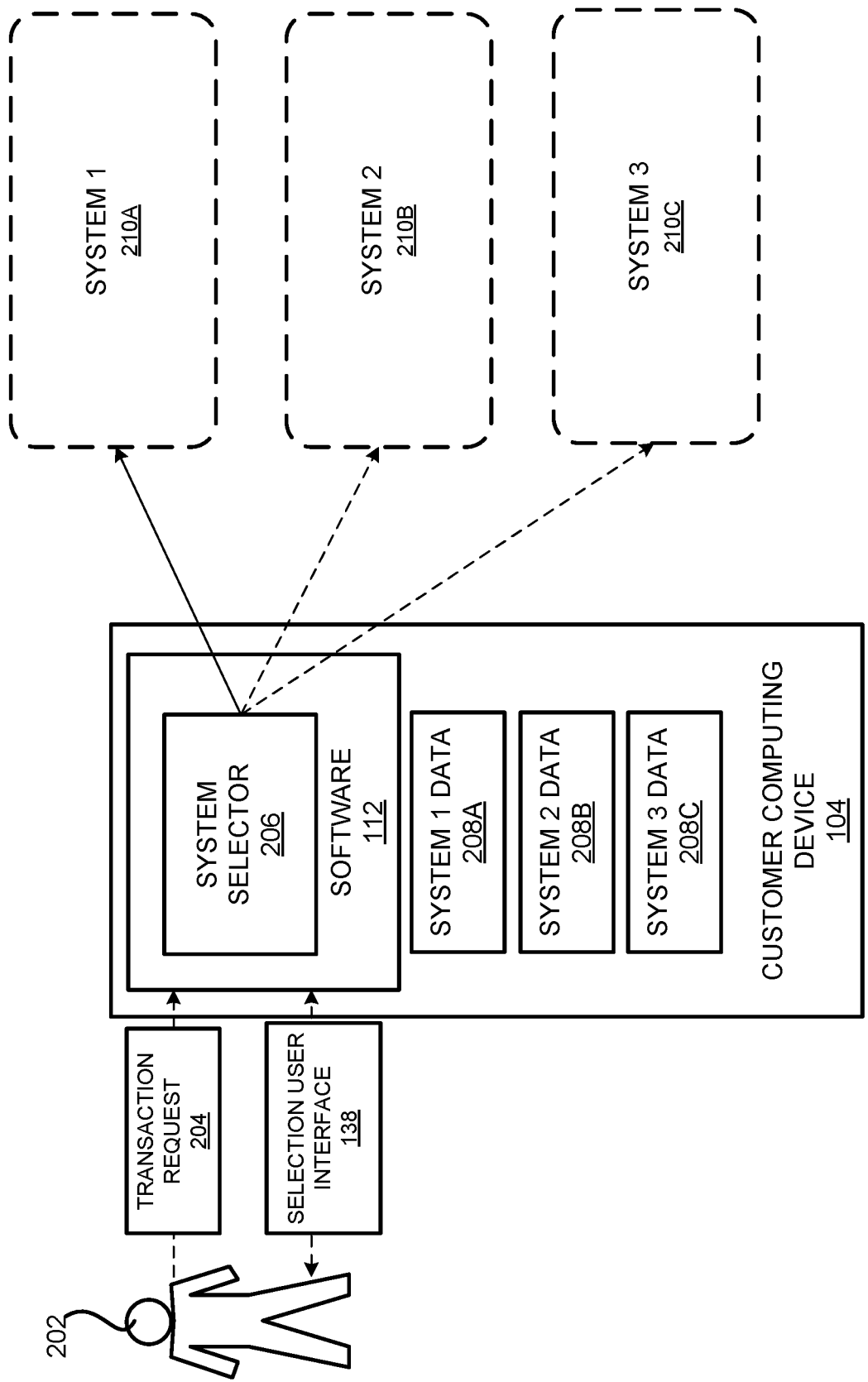
FIG. 2 is a block diagram depicting dynamic identification of and selection of an Application Programming Interface associated with an electronic systems.

FIG. 2 is a block diagram depicting dynamic identification and selection of different electronic systems when performing a transaction. As illustrated in FIG. 2, block diagram 200 includes the developer service 116 that may be utilized in configuring software 112 for selection of one of the electronic systems.

As illustrated, a user 202 can make a transaction request 204 (e.g., an In-App Purchase (IAP) request while using software 112. In response to receiving the transaction request 204, the electronic system selector 206 dynamically identifies the electronic system (e.g., application stores or transaction services that can perform the transaction) and then generates and provides for display the selection UI 138.

According to some configurations, the transaction request identifies the processing to be performed by a remote system. For instance, the processing performed by the remote system may include processing an IAP request, processing associated with obtaining content, services, and the like.

In the current example, the software 112 identifies data (e.g., system 1 data 208A, system 2 data 208B, and system 3 data 208C) that is associated with the three different electronic systems that include system 1 210A, system 2 210B, and system 3 210C. After dynamically identifying the electronic system 210A-210C, the software 112 generates the UI 138. As discussed above, and as illustrated by the example of FIG. 3, the selection UI 138 allows the user 202 to select one of the three available electronic systems 210A-201CC to perform the requested transaction. In the current example, the user 202 has selected the electronic system 210B.

Figure 3:
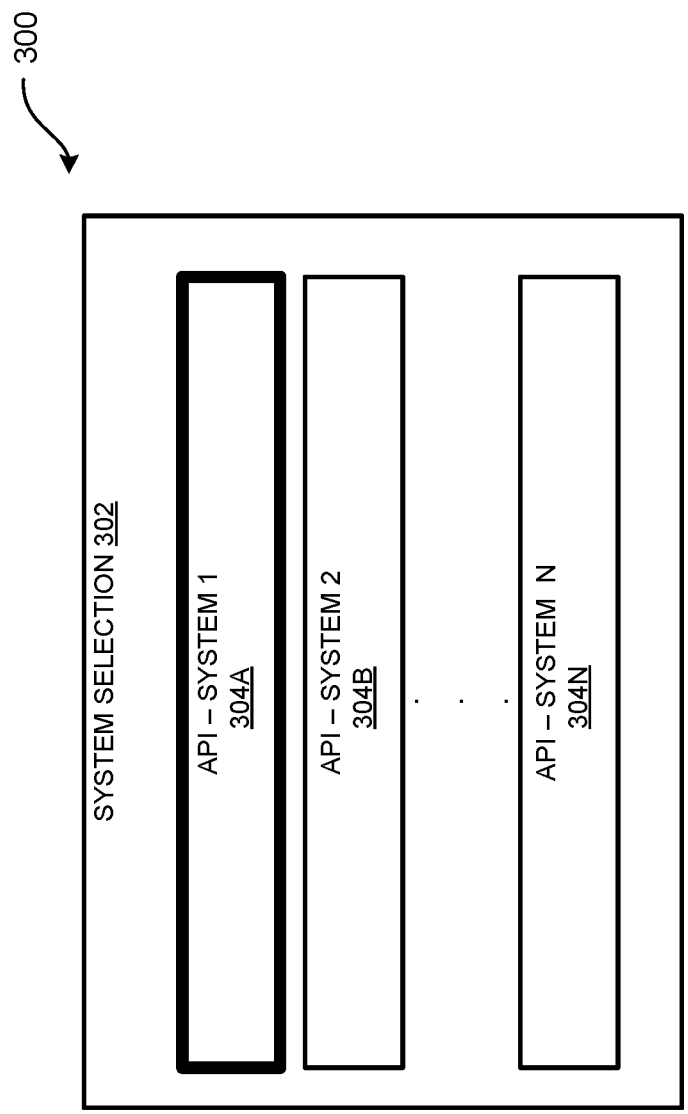
FIG. 3 is a screen diagram showing a graphical user interface used to select an Application Programming Interface associated with an electronic system to perform a transaction.

FIG. 3 is a screen diagram showing a graphical user interface used to select an electronic system to perform a transaction. In the example shown in FIG. 3, the GUI 300 presents an interface that includes UI elements 302 and 304A-304N. The GUI 300 might be generated by the software 112, a component or service associated with the selected electronic system 106, or some other computing device or component, and presented on a computing device. The GUI 300 is illustrated for explanation purposes, and is not intended to be limiting. For example, the GUI 300 might include more or fewer UI elements than illustrated in FIG. 3. The UI elements might also be arranged in a different manner than shown in FIG. 3.

The electronic system selection UI element 302 is configured to display the different electronic systems that are available to perform the transaction. In the example illustrated in FIG. 3, the electronic system selection UI element 302 illustrates N different UI elements 304A-304N. In some examples, the UI elements 304A-304N are selectable by a user (e.g., by clicking or pressing on the UI element).

When one of the UI elements 304 is selected, the software 112 uses the associated electronic system 106 to perform the transaction. In some examples, a default electronic system is highlighted within the user interface 302.

According to some configurations, the determination of the electronic system is configurable. For instance, a user may specify a default electronic system 106 and/or the default electronic system 106 can be determined based on one or more other factors. In some configurations, the default electronic system 106 is based on the electronic system 106 from which the software 112 was acquired. In other examples, the default electronic system 106 is based on the last selected electronic system 106.

The user selects (e.g., by clicking on the desired UI element 304) the electronic system to complete the transaction. If the user chooses an electronic system on which the user has an account, the purchase is made via the software 112 from the selected electronic. When the user does not have an account on the selected electronic system 106, an account can be set up with the selected electronic system.

Figure 4:
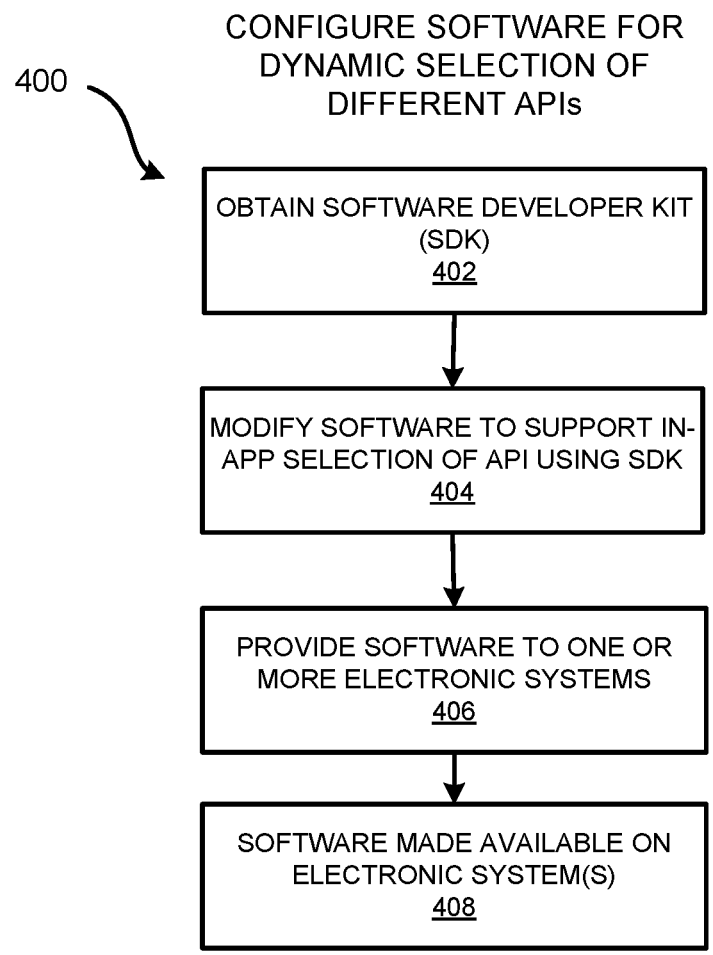
FIG. 4 is a flow diagram showing a method illustrating aspects for configuring software to support selection of different Application Programming Interfaces.
Figure 5:
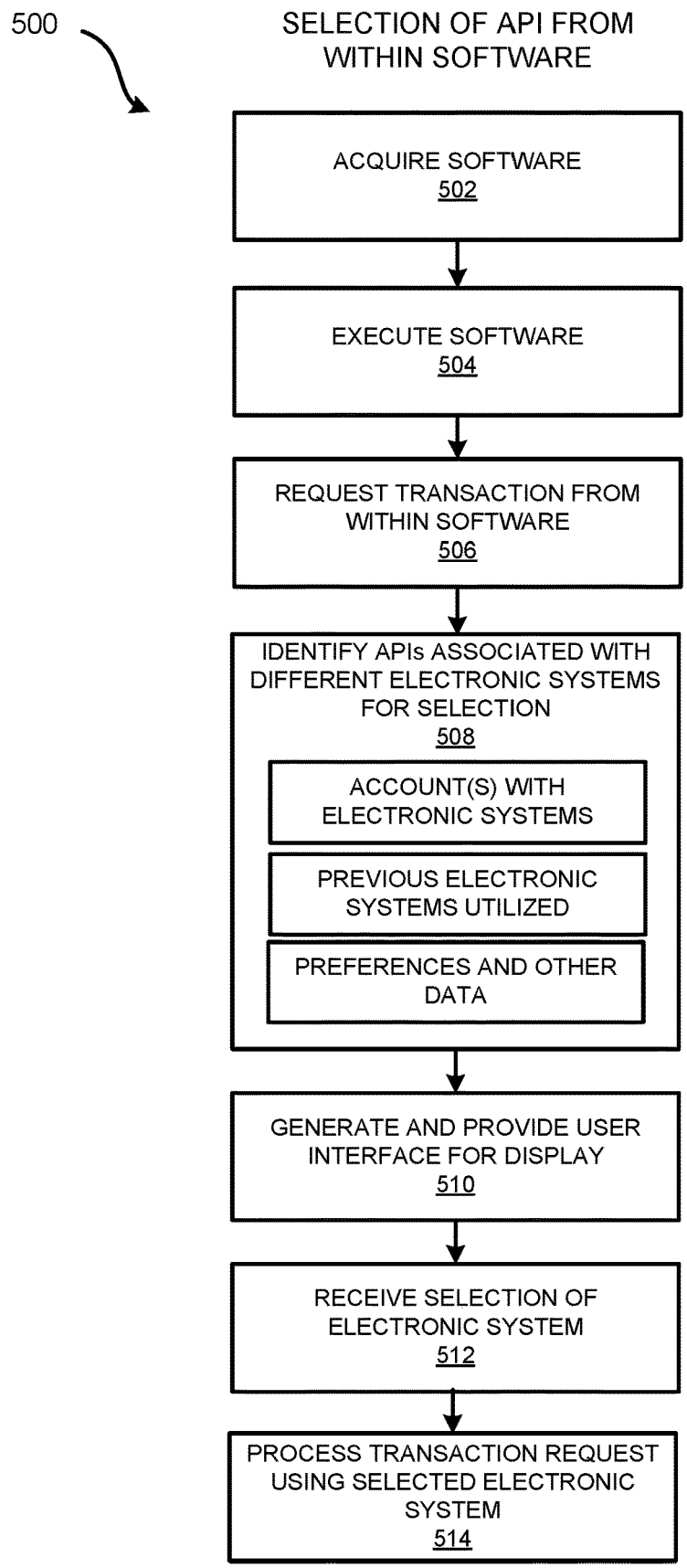
FIG. 5 is a flow diagram showing a method illustrating selection of an Application Programming Interface from within software.

FIGS. 4 and 5 are flow diagrams showing methods 400 and 500 that illustrate aspects of configuring and utilizing software for selecting different electronic systems for transactions. It should be appreciated that the logical operations described herein with respect to FIG. 4, FIG. 5, and the other FIGS., may be implemented (1) as a sequence of computer implemented acts running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, or acts. These operations, structural devices, and acts may be implemented in software, in firmware, in special purpose digital logic and any combination thereof. It should also be appreciated that more or fewer operations may be performed than shown in the drawings and described herein. These operations may also be performed in parallel, or in a different order than those described herein.

Turning now to FIG. 4, method 400 illustrates aspects of configuring software operative to utilize different electronic systems. The method 400 may begin at 402, where a software developer can obtain a SDK from a computing device. As discussed above, the SDK 124 provides functionality for a developing software 112 associated with the selection of the different electronic systems.

At 404, the SDK 124 is used to develop the software 112. In some examples, a software developer, or some other authorized user, can indicate one or more preferences associated with the selection of the one of more electronic systems 106. For example, the software developer may indicate a preference indicating a default electronic system 106 and/or a list of the desired electronic systems.

At 406, the software 112 is provided to one or more electronic systems 106. In some configurations, the same software 112 can be provided to different electronic systems with little to no modification of the software.

At 408, the software 112 is made available for acquisition from one or more electronic systems 106. As discussed above, the electronic system may include hundreds or thousands of different software products and/or services.

FIG. 5 is a flow diagram illustrating aspects of selecting an electronic system from within software. The method 500 may begin at 502, where the software 112 is acquired from an electronic system. For example, an electronic system 106 can transmit the software 112 to a customer computing device 104. As discussed above, the software 112 may be available from one or more electronic systems.

At 504, the software 112 is executed by one or more processors associated with one or more computing devices. In some configurations, the software 112 may execute on a computing device that is external from the service provider network (e.g. a computing device associated with a user). In other configurations, the software 112 may utilize one or more computing devices associated with the service provider network during execution.

At 506, a transaction request by the software to perform a transaction with an electronic system is detected. For example, the software 112, or some other device or service may detect that the user has requested to perform an in-app purchase. In some examples, the software detects that an input has been received via a user interface to perform a transaction. In some configurations, the transaction request identifies content to obtain, processing, such as remote processing, to be performed, and/or other benefits to be provided. According to some configurations, the transaction request identifies the processing to be performed by a remote system. For instance, the processing performed by the remote system may include processing an IAP request, processing associated with obtaining content, services, and the like.

At 508, the available electronic systems to perform the requested transaction are dynamically identified. As discussed above, the software 112 can identify the available services to perform the transaction by analyzing the computing device executing the software 112 for data associated with different electronic systems. In some examples, the software 112 can look for accounts associated with different electronic systems, determine the electronic systems from which the software 112 on the computing device have been utilized, and/or preferences or other data indicating the approved electronic systems.

At 510, a user interface is generated for selection of the electronic system. As discussed above, the user interface can be a GUI 138 generated by the software 112 on the customer computing device 104 that includes selectable user interface elements associated with individual ones of the electronic system.

At 512, a selection of one of the electronic systems 106 is received. As discussed above, the software 112 can detect that an input has been received (e.g., the user may select one of the selectable user interface elements) via the graphical user interface.

At 514, the software 112 connects to the selected electronic system and causes the electronic system to perform the transaction. As discussed above, the software 112 utilizes functionality exposed by the SDK 124 and/or the API(s) 126 for accessing the electronic system. For example, the software 112 selects an API call associated with the selected electronic system to request the transaction to be performed.

Figure 6:
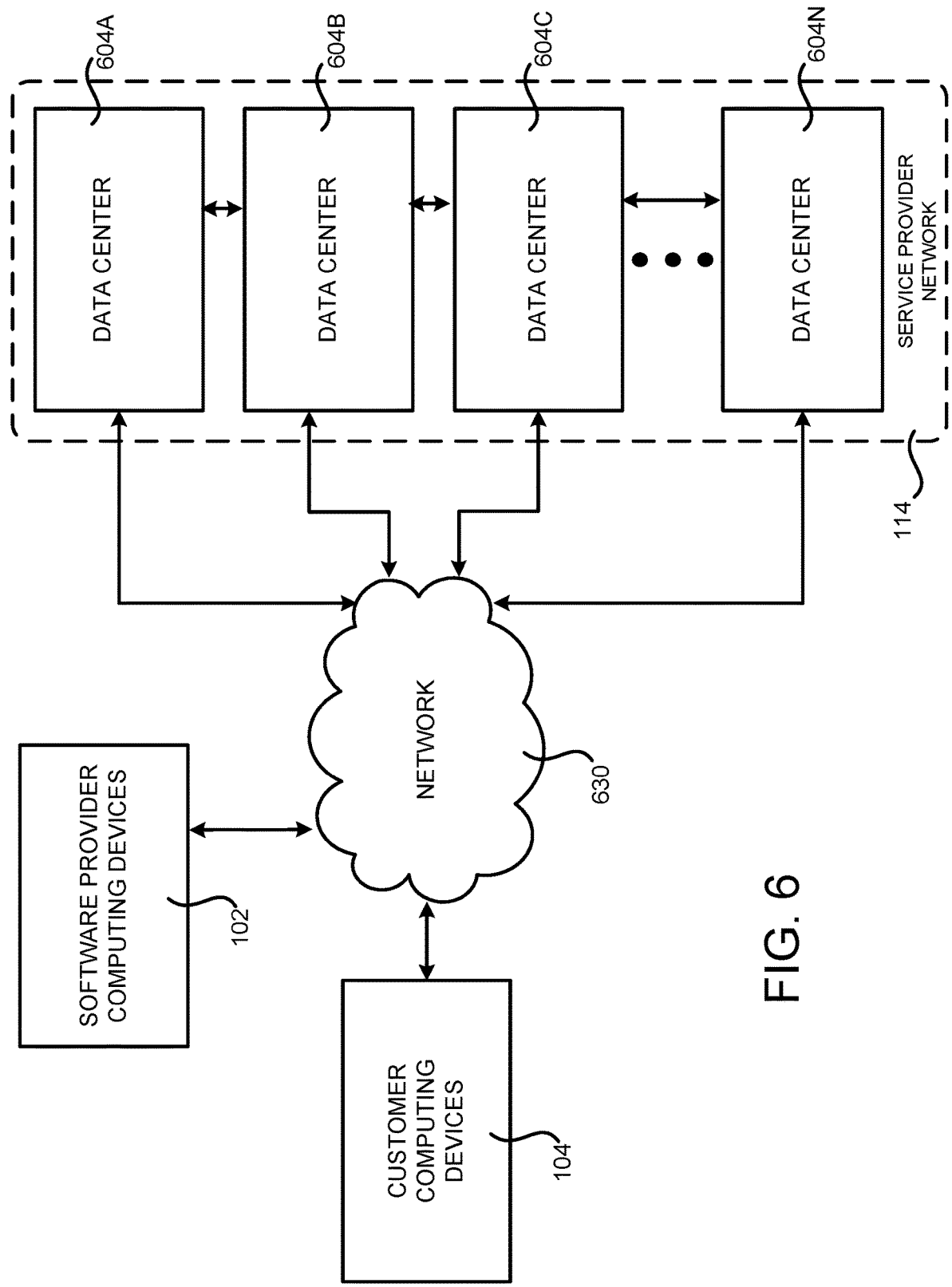
FIG. 6 is a system and network diagram that shows one illustrative service provider network.

FIG. 6 and the following description are intended to provide a brief, general description of a service provider network in which the examples described herein may be implemented. In particular, FIG. 6 is a system and network diagram that shows a service provider network 114. As discussed above, the service provider network 114 can provide virtual machine instances and computing resources on a permanent or an as-needed basis.

The computing resources provided by the service provider network 114 may include various types of resources, such as data processing resources, data storage resources, networking resources, data communication resources and the like. Each type of computing resource may be general-purpose or may be available in a number of specific configurations. For example, and as will be described in greater detail below, data processing resources may be available as virtual machine instances in a number of different configurations. The virtual machine instances may be configured to execute applications, including Web servers, application servers, media servers, database servers and other types of applications. Data storage resources may include file storage devices, block storage devices and the like. Each type or configuration of a virtual machine instance of a computing resource may be available in different sizes, such as large resources, consisting of many processors, large amounts of memory, and/or large storage capacity, and small resources consisting of fewer processors, smaller amounts of memory and/or smaller storage capacity.

The computing resources provided by the service provider network 114 are enabled in one implementation by one or more data centers 604A-604N (which may be referred to herein singularly as "a data center 604" or collectively as "the data centers 604"). The data centers 604 are facilities utilized to house and operate computer systems and associated components. The data centers 604 typically include redundant and backup power, communications, cooling and security systems. The data centers 604 might also be located in geographically disparate locations. One illustrative configuration for a data center 604 that implements some or all of the concepts and technologies disclosed herein will be described below with regard to FIG. 7.

The users and customers of the service provider network 114 may access the computing resources provided by the data centers 604 over a suitable data communications network, such as a Wide Area Network ("WAN"), as illustrated by network 630. Although a WAN might be used, it should be appreciated that a local-area network ("LAN"), the Internet, or any other networking topology known in the art that connects the data centers 604 to the customer computing devices 104, the software provider computing devices 102 may be utilized. It should also be appreciated that combinations of such networks might also be utilized.

Figure 7:
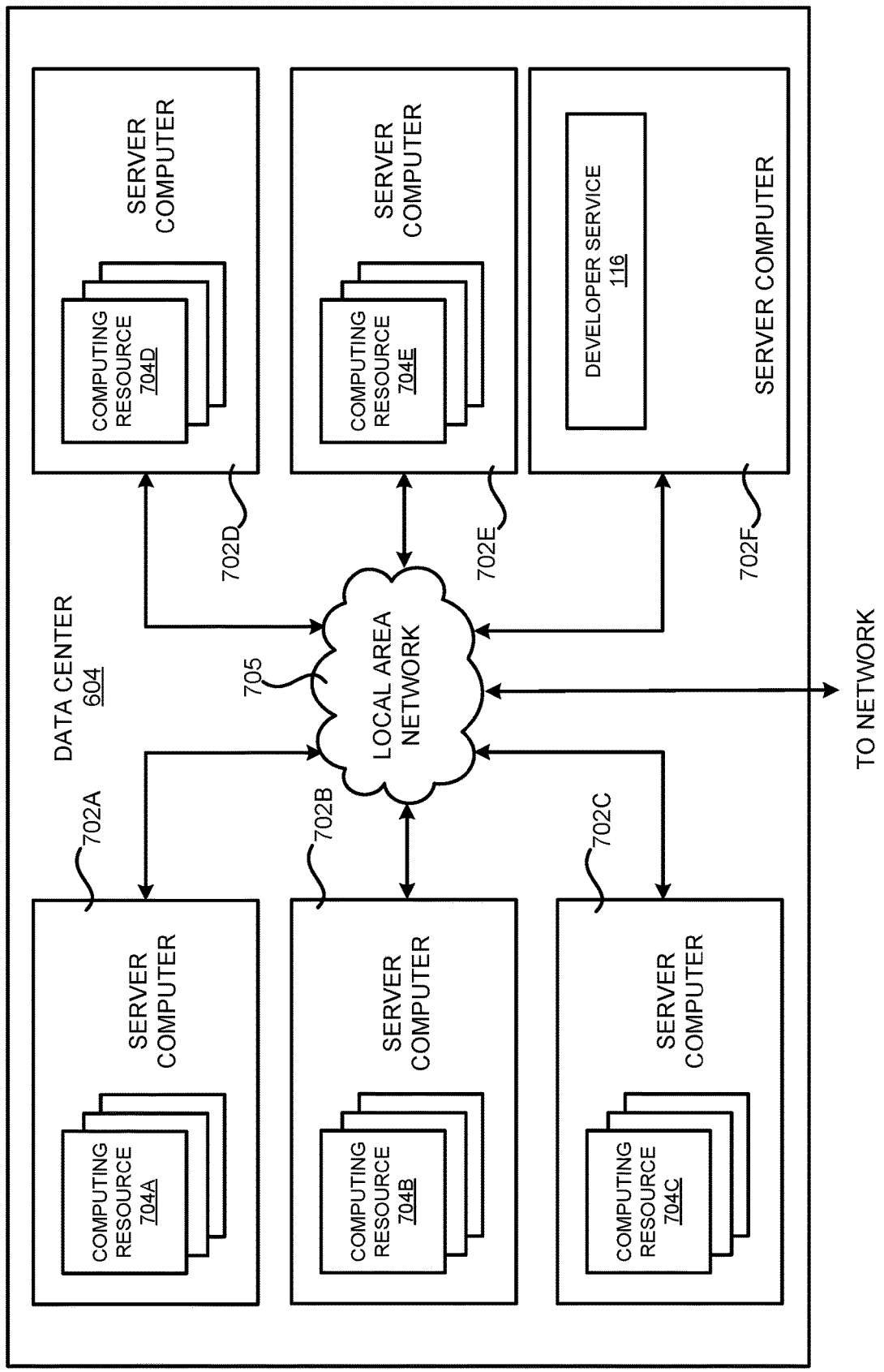
FIG. 7 is a computing system diagram that illustrates one configuration for a data center that implements aspects of a service provider network, including some or all of the concepts and technologies disclosed herein relating to selection of an Application Programming Interface associated with an electronic system to perform a transaction.

FIG. 7 is a computing system diagram that illustrates one configuration for a data center 604 that implements aspects of a service provider network 114, including some or all of the concepts and technologies disclosed herein for selecting an electronic system from a plurality of electronic systems for performing a transaction. The example data center 604 shown in FIG. 7 includes several server computers 702A-702F (which may be referred to herein singularly as "a server computer 702" or in the plural as "the server computers 702") for providing computing resources. The server computers 702 may be standard tower or rack-mount server computers configured appropriately for providing the computing resources described herein. According to an example, the server computers 702 are configured to execute the software 112 as described above.

In one example, some of the computing resources 704 are virtual machine instances. As known in the art, a virtual machine instance is an instance of a software implementation of a machine (i.e. a computer) that executes programs like a physical machine. Each of the server computers 702 may be configured to execute an instance manager (not shown) capable of instantiating and managing computing resources and instances of computing resources. In the case of virtual machine instances, for example, the instance manager might be a hypervisor or another type of program configured to enable the execution of multiple virtual machine instances on a single server computer 702, for example.

It should be appreciated that although the examples disclosed herein are described primarily in the context of virtual machine instances, other types of computing resources can be utilized with the concepts and technologies disclosed herein. For instance, the technologies disclosed herein might be utilized with hardware resources, data storage resources, data communications resources, networking resources, database resources and with other types of computing resources.

The data center 604 shown in FIG. 7 also includes a server computer 702F reserved for executing software components for managing the operation of the data center 604, the server computers 702, virtual machine instances, and other resources within the service provider network 114. The server computer 702F might also execute other components described herein. Details regarding the operation of each of these components has been provided above. In this regard, it should be appreciated that while these components are illustrated as executing within the service provider network 114, computing systems that are external to the service provider network 114 might also be utilized to execute some or all of these components. Other configurations might also be utilized.

In the example data center 604 shown in FIG. 7, an appropriate local area network ("LAN") 705 is utilized to interconnect the server computers 702A-702E and the server computer 702F. The LAN 705 is also connected to the network 630 illustrated in FIG. 6. It should be appreciated that the configuration and network topology illustrated in FIGS. 6 and 7 has been greatly simplified and that many more computing systems, networks and networking devices may be utilized to interconnect the various computing systems disclosed herein. Appropriate load balancing devices or software modules might also be utilized for balancing a load between each of the data centers 604A-604N, between each of the server computers 702A-702F in each data center 604 and between virtual machine instances and other types of computing resources provided by the service provider network 114.

It should be appreciated that the data center 604 described in FIG. 7 is merely illustrative and that other implementations might also be utilized. Additionally, it should be appreciated that the functionality provided by these components might be implemented in software, hardware, or a combination of software and hardware. Other implementations should be apparent to those skilled in the art.

Figure 8:
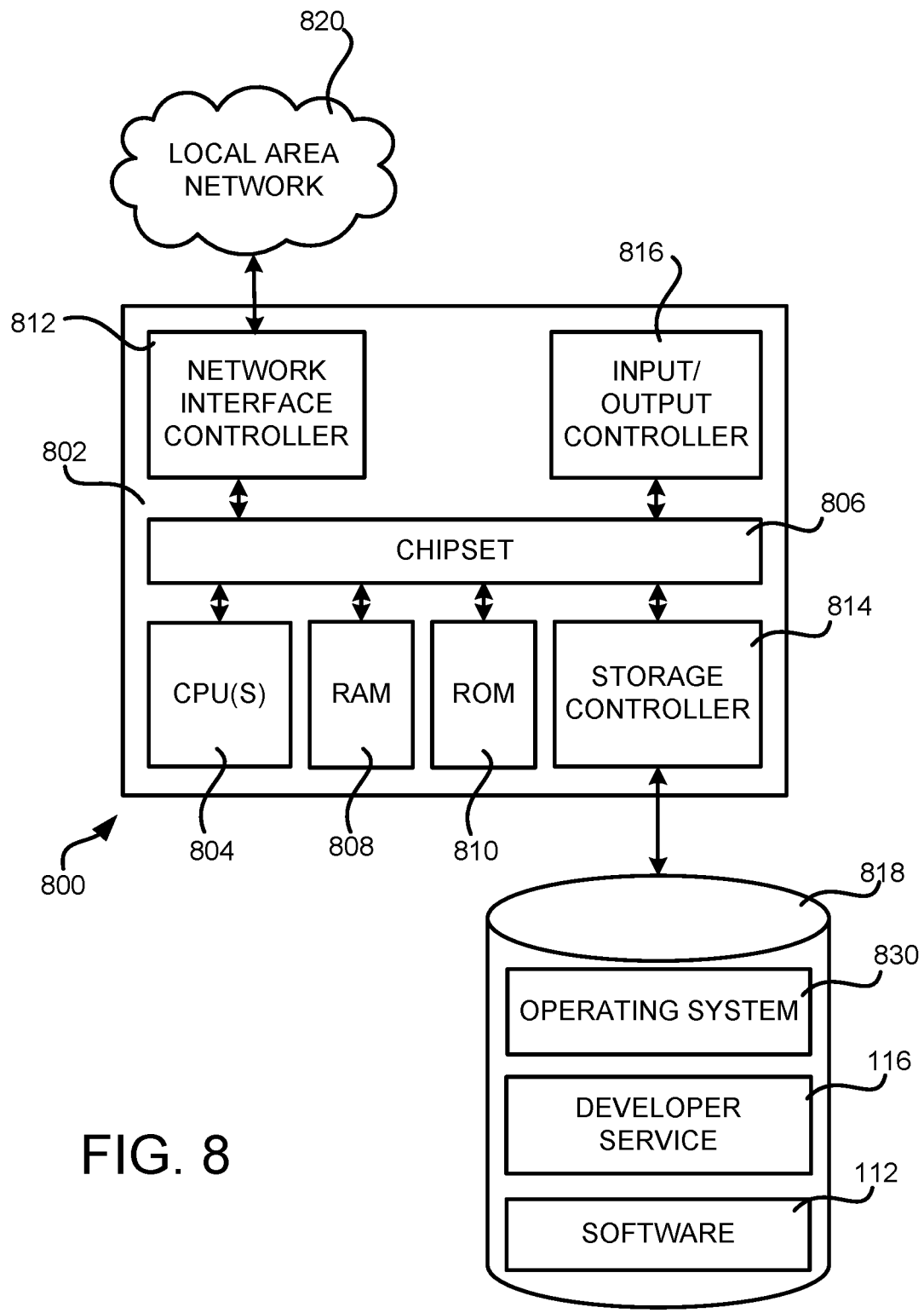
FIG. 8 is a computer architecture diagram showing one illustrative computer hardware architecture for implementing a computing device that might be utilized to implement aspects of the various examples presented herein.

FIG. 8 shows an example computer architecture for a computer 800 capable of executing program components for dynamically identifying and utilizing different electronic systems to perform transactions. The computer architecture shown in FIG. 8 illustrates a conventional server computer, workstation, desktop computer, laptop, tablet, network appliance, personal digital assistant ("PDA"), e-reader, digital cellular phone, or other computing device, and may be utilized to execute any of the software components presented herein. For example, the computer architecture shown in FIG. 8 may be utilized to execute software components for performing operations as described above. The computer architecture shown in FIG. 8 might also be utilized to implement a customer computing device 104, a software provider computing device 102 or any other of the computing systems described herein.

The computer 800 includes a baseboard 802, or "motherboard," which is a printed circuit board to which a multitude of components or devices may be connected by way of a system bus or other electrical communication paths. In one illustrative example, one or more central processing units ("CPUs") 804 operate in conjunction with a chipset 806. The CPUs 804 may be standard programmable processors that perform arithmetic and logical operations necessary for the operation of the computer 800.

The CPUs 804 perform operations by transitioning from one discrete, physical state to the next through the manipulation of switching elements that differentiate between and change these states. Switching elements may generally include electronic circuits that maintain one of two binary states, such as flip-flops and electronic circuits that provide an output state based on the logical combination of the states of one or more other switching elements, such as logic gates. These basic switching elements may be combined to create more complex logic circuits, including registers, adders-subtractors, arithmetic logic units, floating-point units and the like.

The chipset 806 provides an interface between the CPUs 804 and the remainder of the components and devices on the baseboard 802. The chipset 806 may provide an interface to a RAM 808, used as the main memory in the computer 800. The chipset 806 may further provide an interface to a computer-readable storage medium such as a read-only memory ("ROM") 810 or non-volatile RAM ("NVRAM") for storing basic methods that help to startup the computer 800 and to transfer information between the various components and devices. The ROM 810 or NVRAM may also store other software components necessary for the operation of the computer 800 in accordance with the examples described herein.

The computer 800 may operate in a network using logical connections to remote computing devices and computer systems through a network, such as the local area network 820. The chipset 806 may include functionality for providing network connectivity through a network interface controller ("NIC") 812, such as a gigabit Ethernet adapter. The NIC 812 is capable of connecting the computer 800 to other computing devices over the local area network 820. It should be appreciated that multiple NICs 812 may be present in the computer 800, connecting the computer to other types of networks and remote computer systems.

The computer 800 may be connected to a mass storage device 818 that provides non-volatile storage for the computer. The mass storage device 818 may store system programs, application programs, other program modules and data, which have been described in greater detail herein. The mass storage device 818 may be connected to the computer 800 through a storage controller 814 connected to the chipset 806. The mass storage device 818 may consist of one or more physical storage units. The storage controller 814 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 800 may store data on the mass storage device 818 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 818 is characterized as primary or secondary storage and the like.

For example, the computer 800 may store information to the mass storage device 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 800 may further read information from the mass storage device 818 by detecting the physical states or characteristics of one or more particular locations within the physical storage units.

In addition to the mass storage device 818 described above, the computer 800 may have access to other computer-readable storage media to store and retrieve information, such as program modules, data structures, or other data. It should be appreciated by those skilled in the art that computer-readable storage media is any available media that provides for the non-transitory storage of data and that may be accessed by the computer 800.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 818 may store an operating system 830 utilized to control the operation of the computer 800. According to one example, the operating system comprises the LINUX operating system. According to another example, the operating system comprises the WINDOWS® SERVER operating system from MICROSOFT Corporation. According to further examples, the operating system may comprise the UNIX operating system. It should be appreciated that other operating systems may also be utilized. The mass storage device 818 may store other system or application programs and data utilized by the computer 800, such as components that include the developer service 116, the software 112 and/or any of the other software components and data described above. The mass storage device 818 might also store other programs and data not specifically identified herein.

In one example, the mass storage device 818 or other computer-readable storage media is encoded with computer-executable instructions that, when loaded into the computer 800, transform the computer from a general-purpose computing system into a special-purpose computer capable of implementing the examples described herein. These computer-executable instructions transform the computer 800 by specifying how the CPUs 804 transition between states, as described above. According to one example, the computer 800 has access to computer-readable storage media storing computer-executable instructions which, when executed by the computer 800, perform the various methods described above with regard to FIG. 4 and FIG. 5. The computer 800 might also include computer-readable storage media for performing any of the other computer-implemented operations described herein.

The computer 800 may also include one or more input/output controllers 816 for receiving and processing input from a number of input devices, such as a keyboard, a mouse, a touchpad, a touch screen, an electronic stylus, or other type of input device. Similarly, the input/output controller 816 may provide output to a display, such as a computer monitor, a flat-panel display, a digital projector, a printer, a plotter, or other type of output device. It will be appreciated that the computer 800 may not include all of the components shown in FIG. 8, may include other components that are not explicitly shown in FIG. 8, or may utilize an architecture completely different than that shown in FIG. 8.

Based on the foregoing, it should be appreciated that technologies for dynamically identifying and utilizing different electronic services 108 to complete transactions for a software 112 have been presented herein. Moreover, although the subject matter presented herein has been described in language specific to computer structural features, methodological acts and computer readable media, it is to be understood that the invention defined in the appended claims is not necessarily limited to the specific features, acts, or media described herein. Rather, the specific features, acts and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example examples and applications illustrated and described, and without departing from the true spirit and scope of the present invention, which is set forth in the following claims.

What is claimed is:

1. Non-transitory computer-readable storage media having computer-executable instructions stored thereupon which, when executed by one or more computers, cause the one or more computers to perform actions, comprising:
receiving data, from software executing on a computing device and acquired from a first application store, wherein the software is available from a plurality of application stores and configured to access functionality from an Application Programming Interface (API) for In-App purchase (IAP) requests for purchases via the plurality of application stores including at least the first application store and a second application store;
determining that the data identifies a transaction request made during execution of the software on the computing device for an IAP via an application store selected from the plurality of application stores;
identifying a first electronic system, associated with the first application store, to which the software is configured to send the transaction request for the IAP;
identifying a second electronic system, associated with the second application store, that is an alternative to the first electronic system to process the transaction request for the IAP, wherein calls to the second electronic system are absent from the software;
generating a user interface that includes a first user selectable option associated with the first electronic system and the first application store and a second user selectable option associated with the second electronic system and the second application store;
causing the user interface to be presented on a display of the computing device;
receiving a selection of the second user selectable option;
selecting the second electronic system to process the transaction request for the IAP; and
causing an API call associated with the first electronic system to be replaced with a second API call in the software, the second API call associated with the second electronic system to process the transaction request.

2. The non-transitory computer-readable storage media of claim 1, wherein identifying the second electronic system comprises analyzing data on of the computing device on which the software is executing to determine that the second electronic system has been used to process one or more transactions from one or more requests made by other software acquired from the second application store.

3. The non-transitory computer-readable storage media of claim 1, wherein the actions further comprise preventing execution of at least a portion of functionality of the software on the computing device from which the data was received until an account is associated with at least one of the plurality of application stores.

4. The non-transitory computer-readable storage media of claim 1, wherein the software is developed using a software developer kit, wherein the software developer kit is associated with one or more application programming interfaces that expose functionality for identifying the first electronic system associated with the first application store and the second electronic system associated with the second application store, generating the user interface, and causing at least one of the first electronic system or the second electronic system to process the transaction request.

5. The non-transitory computer-readable storage media of claim 1, wherein identifying the first electronic system includes identifying that the computing device includes first data identifying a first account with the first electronic system associated with the first application store and wherein identifying the second electronic system includes identifying that the second electronic system associated with the second application store supports processing the transaction request.

6. A computer-implemented method, comprising:
receiving data, from a computing device executing software acquired from a first application store, wherein the software is available from a plurality of application stores and configured to access functionality from an Application Programming Interface (API) for In-App purchase (IAP) requests for purchases via the plurality of application stores including at least the first application store and a second application store;
determining that the data identifies a transaction request made during execution of the software on the computing device for an IAP via an application store selected from the plurality of application stores;
identifying a first electronic system, associated with the first application store, to which the software is configured to send the transaction request for the IAP;
identifying a second electronic system, associated with the second application store, that is an alternative to the first electronic system to process the transaction request for the IAP, wherein calls to the second electronic system are absent from the software;
generating a user interface that includes a first user selectable option associated with the first electronic system and the first application store and a second user selectable option associated with the second electronic system and the second application store;
causing the user interface to be presented on a display of the computing device;
receiving a selection of the second user selectable option;
selecting the second electronic system to process the transaction request for the IAP; and
causing an API call associated with the first electronic system to be replaced with a second API call in the software, the second API call associated with the second electronic system to process the transaction request.

7. The computer-implemented method of claim 6, further comprising preventing execution of at least a portion of functionality of the software on the computing device until an account is associated with at least one of the plurality of application stores.

8. The computer-implemented method of claim 6, wherein identifying one or more of the first electronic system or the second electronic system the includes analyzing a memory of the computing device generating the transaction request to identify one or more previous transaction requests with one or more of the first electronic system or the second electronic system.

9. The computer-implemented method of claim 8, wherein identifying the first electronic system and the second electronic system includes identifying first software on the computing device that is associated with the first electronic system and a first application store, and second software on the computing device that is associated with the second electronic system and a second application store.

10. The computer-implemented method of claim 8, wherein identifying the first electronic system and the second electronic system includes identifying a first account associated with the first electronic system, and identifying a second account associated with the second electronic system.

11. The computer-implemented method of claim 6, wherein identifying the transaction request comprises determining that the IAP is a type of transaction request to acquire one or more of content, or a service for use by the software.

12. The computer-implemented method of claim 6, wherein the software was obtained from a selected electronic system.

13. The computer-implemented method of claim 6, wherein the first electronic system provides a software developer kit (SDK) that includes functionality for developing software for accessing the first electronic system and the second electronic system.

14. The computer-implemented method of claim 6, wherein software that generates the request to process the transaction request uses one or more application programming interfaces obtained from the first electronic system to access a selected electronic system.

15. The computer-implemented method of claim 6, further comprising determining a default electronic system based at least in part on one or more of a configurable parameter that identifies the default electronic system or an identification of an electronic system from which software that generates the request to process the transaction request was obtained.

16. The computer-implemented method of claim 6, further comprising graphically indicating within the user interface that the second electronic system is a default electronic system.

17. A system, comprising:
one or more processors configured to perform actions, including to:
receive data, from a computing device executing software acquired from a first application store, wherein the software is available from a plurality of application stores and configured to access functionality from an Application Programming Interface (API) for In-App purchase (IAP) requests for purchases via the plurality of application stores including at least the first application store and a second application store;
determine that the data identifies a transaction request made during execution of the software on the computing device for an IAP via an application store selected from the plurality of application stores;
identify at least partly in response to receiving the transaction request, a first electronic system associated with the first application store to which the software is configured to send the transaction request for the IAP;
identify a second electronic system associated with the second application store that is an alternative to the first electronic system to process the transaction request for the IAP, wherein calls to the second electronic system are absent from the software;
generate a user interface that includes a first user selectable option associated with the first electronic system and the first application store and a second user selectable option associated with the second electronic system and the second application store;
cause the user interface to be presented on a display of the computing device;
receive a selection of the second user selectable option;
select the second electronic system to process the transaction request for the IAP; and
cause an API call associated with the first electronic system to be replaced with a second API call in the software, the second API call associated with the second electronic system to process the transaction request.

18. The system of claim 17, wherein the one or more processors are configured to perform further actions including to prevent execution of at least a portion of functionality of the software on the computing device until an account is associated with at least one of the plurality of application stores.

19. The system of claim 17, wherein identifying the first electronic system and the second electronic system includes identifying an account associated with one or more of the first electronic system or the second electronic system.

20. The system of claim 17, wherein the one or more processors are configured to perform further actions including to graphically indicate within the user interface a default electronic system.

* * * * *